United States Patent
Takahashi et al.

(10) Patent No.: US 8,053,118 B2
(45) Date of Patent: Nov. 8, 2011

(54) HYDROGEN AND POWER GENERATION SYSTEM AND METHOD FOR SHUTTING DOWN THE SAME

(75) Inventors: Koichi Takahashi, Utsunomiya (JP); Jun Takeuchi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 582 days.

(21) Appl. No.: 12/270,599

(22) Filed: Nov. 13, 2008

(65) Prior Publication Data

US 2009/0123791 A1    May 14, 2009

(30) Foreign Application Priority Data

Nov. 13, 2007 (JP) .................................. 2007-294477

(51) Int. Cl.
*H01M 8/06* (2006.01)
(52) U.S. Cl. ........................................................ 429/411
(58) Field of Classification Search .................. 429/411, 429/412, 400, 423
See application file for complete search history.

(56) References Cited

U.S. PATENT DOCUMENTS

| 7,252,900 B2 | 8/2007 | Ballantine et al. | |
| 7,691,507 B2 * | 4/2010 | Ballantine et al. | 429/411 |
| 2004/0253494 A1 | 12/2004 | Maruyama et al. | |
| 2005/0053813 A1 * | 3/2005 | Ballantine et al. | 429/22 |
| 2006/0065520 A1 * | 3/2006 | Ballantine et al. | 204/279 |

FOREIGN PATENT DOCUMENTS

| JP | 2001-57222 | 2/2001 |
| JP | 2003-82486 | 3/2003 |
| JP | 2004-247290 | 9/2004 |
| JP | 2007505472 T | 3/2007 |

OTHER PUBLICATIONS

Japanese Office Action for Application No. 2007-294477, dated Jan. 19, 2010.

* cited by examiner

*Primary Examiner* — Phuong Dinh
(74) *Attorney, Agent, or Firm* — Nelson Mullins Riley & Scarborough LLP; Anthony A. Laurentano

(57) ABSTRACT

A hydrogen and power generation system includes a reforming device for producing a reformed gas from a reformable raw fuel, a combination fuel cell and ion pump operable selectively in a hydrogen generation mode and an electricity generation mode, a PSA mechanism for removing an unwanted component from the hydrogen produced by the combination fuel cell and ion pump, the PSA mechanism 18 having adsorption towers held in fluid communication with the cathode for receiving hydrogen from the combination fuel cell and ion pump, and a PSA off-gas passage having one end connected to an off-gas outlet of the PSA mechanism and another end connected to a reformed gas passage, which provides fluid communication between a reformed gas outlet of the reforming device and an anode inlet of the combination fuel cell and ion pump.

7 Claims, 10 Drawing Sheets

HYDROGEN AND POWER GENERATION SYSTEM AND METHOD FOR SHUTTING DOWN THE SAME

BACKGROUND OF THE INVENTION

1. Field of the Invention

The present invention relates to a hydrogen and power generation system comprising at least a reforming device and a combination fuel cell and ion pump, which is selectively operable in a hydrogen generation mode and an electricity generation mode when an anode thereof is supplied with a reformed gas from the reforming device. The present invention also concerns a method of shutting down such a hydrogen and power generation system.

2. Description of the Related Art

Fuel cells are a system for generating DC electric energy from an electrochemical reaction caused when anode and cathode are supplied with a fuel gas, i.e., a gas mainly containing hydrogen, and an oxygen-containing gas, i.e., a gas mainly containing oxygen.

For example, a solid polymer electrolyte fuel cell includes a power generation cell having a membrane electrode assembly sandwiched between separators. The membrane electrode assembly comprises an electrolyte membrane in the form of a polymer ion exchange membrane, and anode and cathode that are disposed on respective opposite sides of the electrolyte membrane. Usually, a predetermined number of membrane electrode assemblies and a predetermined number of separators are stacked together in a fuel cell stack for use on vehicles such as automobiles, or for use in home energy stations for meeting domestic electric power needs.

The fuel gas supplied to fuel cells normally comprises a hydrogen gas, which is generated from a raw material such as a hydrocarbon material by a reforming device. Generally, the reforming device operates to produce a reformable raw gas from a raw hydrocarbon material such as methane, LNG, or the like, and then to reform the reformable raw gas according to a water vapor reforming process, a partial oxidation reforming process, or an automatic thermal reforming process, for thereby generating a reformed gas (fuel gas).

The fuel gas generated by the reforming device needs to be converted into highly pure hydrogen gas (refined hydrogen gas), which may be compressed for storage. To this end, a combination fuel cell and ion pump disclosed in Japanese Laid-Open Patent Publication No. 2007-505472 (PCT) has been employed.

The combination fuel cell and ion pump comprises an electrochemical cell having an anode inlet for receiving a fuel, an anode outlet for discharging the fuel, a cathode inlet for receiving an oxidizer, a cathode outlet for discharging at least one of the oxidizer, refined oxygen, and refined hydrogen, a first connector, and a second connector, and a controller for providing electric charges to the first and second connectors in order to cause the electrochemical cell to act as a fuel cell for generating electricity, and for providing potentials to the first and second connectors in order to cause the electrochemical cell to act as at least one of a hydrogen pump for refining hydrogen and an oxygen pump for refining oxygen.

The combination fuel cell and ion pump is selectively operable in a hydrogen generation (hydrogen pump) mode and electricity generation (fuel cell) mode. In the hydrogen generation mode, hydrogen generated by the cathode of the combination fuel cell and ion pump is kept under a pressure, which is higher than that of the reformed gas supplied to the anode.

When the hydrogen generation mode is canceled, therefore, hydrogen gas remaining in the cathode of the combination fuel cell and ion pump needs to be depressurized or lowered in pressure. If the hydrogen gas remains under a high pressure in the cathode, then the hydrogen gas tends to diffuse into the anode and move into the reforming device.

One possible solution is to connect a depressurizing line to the cathode of the combination fuel cell and ion pump, and to treat the hydrogen gas with a flare combustor, or to vent the hydrogen gas to the atmosphere. However, since a dedicated facility is needed in order to depressurize hydrogen gas, this proposal is not economical, and the facility itself becomes large in size.

SUMMARY OF THE INVENTION

An object of the present invention is to provide a hydrogen and power generation system, which is capable of reliably depressurizing the cathode of a combination fuel cell and ion pump when a hydrogen generation mode thereof is canceled, and which is both economical and small in size. A further object of the present invention is to provide a method of shutting down the hydrogen and power generation system.

According to the present invention, there is provided a hydrogen and power generation system comprising a reforming device for producing a reformed gas by reforming a raw fuel mainly composed of hydrocarbons, the reforming device having a combustor as a heat source, a combination fuel cell and ion pump comprising a membrane electrode assembly having an electrolyte and a pair of anode and cathode disposed on respective opposite sides of the electrolyte, the combination fuel cell and ion pump being operable selectively in a hydrogen generation mode for delivering hydrogen in the reformed gas through the electrolyte to the cathode by supplying the reformed gas to the anode while applying a potential between the anode and the cathode, and an electricity generation mode for generating electricity by supplying the reformed gas to the anode and supplying an oxygen-containing gas to the cathode while applying a potential between the anode and the cathode, a reformed gas passage providing fluid communication between a reformed gas outlet of the reforming device and an anode inlet of the combination fuel cell and ion pump, a PSA mechanism for removing an unwanted component from the hydrogen produced by the combination fuel cell and ion pump, the PSA mechanism having an adsorption tower held in fluid communication with the cathode, for receiving the hydrogen from the combination fuel cell and ion pump, and a PSA off-gas passage having one end connected to an off-gas outlet of the PSA mechanism and another end connected to the reformed gas passage.

According to the present invention, there is also provided a method of shutting down a hydrogen and power generation system including a reforming device for producing a reformed gas by reforming a raw fuel mainly composed of hydrocarbons, the reforming device having a combustor as a heat source, a combination fuel cell and ion pump comprising a membrane electrode assembly having an electrolyte and a pair of anode and cathode disposed on respective opposite sides of the electrolyte, the combination fuel cell and ion pump being operable selectively in a hydrogen generation mode for delivering hydrogen in the reformed gas through the electrolyte to the cathode by supplying the reformed gas to the anode while applying a potential between the anode and the cathode, and an electricity generation mode for generating electricity by supplying the reformed gas to the anode and supplying an oxygen-containing gas to the cathode while applying a potential between the anode and the cathode, a reformed gas passage providing fluid communication between a reformed gas outlet of the reforming device and an anode inlet of the combination fuel cell and ion pump, a PSA mechanism for removing an unwanted component from the hydrogen produced by the combination fuel cell and ion pump, the PSA mechanism having an adsorption tower held in fluid communication with the cathode, for receiving the hydrogen from the combination fuel cell and ion pump, and a PSA off-gas passage having one end connected to an off-gas outlet of the PSA mechanism and another end connected to the reformed gas passage.

The method comprises the step of controlling valves of the PSA mechanism in order to reduce the pressure in the cathode of the combination fuel cell and ion pump and the pressure in the adsorption tower of the PSA mechanism through the PSA off-gas passage when the hydrogen generation mode has finished.

According to the present invention, the off-gas outlet of the PSA mechanism, which is held in fluid communication with the cathode of the combination fuel cell and ion pump, is connected through the PSA off-gas passage to the reformed gas passage, which provides fluid communication between the reformed gas outlet of the reforming device and the anode of the combination fuel cell and ion pump.

Therefore, when the hydrogen generation mode is halted, hydrogen gas in the cathode of the combination fuel cell and ion pump and the hydrogen in the adsorption tower of the PSA mechanism are discharged through the PSA off-gas passage into the reformed gas passage, thereby lowering the pressure in the cathode and the pressure in the adsorption tower of the PSA mechanism. Consequently, no residual hydrogen is diffused from the cathode into the anode of the combination fuel cell and ion pump, and hence, the combustor is prevented from causing excessive combustion while the hydrogen and power generation system is at rest.

Since the hydrogen gas in the cathode and the adsorption tower of the PSA mechanism is discharged into the reformed gas passage, such discharged hydrogen gas can be recycled. Therefore, the cathode is reliably depressurized, and the overall hydrogen and power generation system is made economical and smaller in size.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
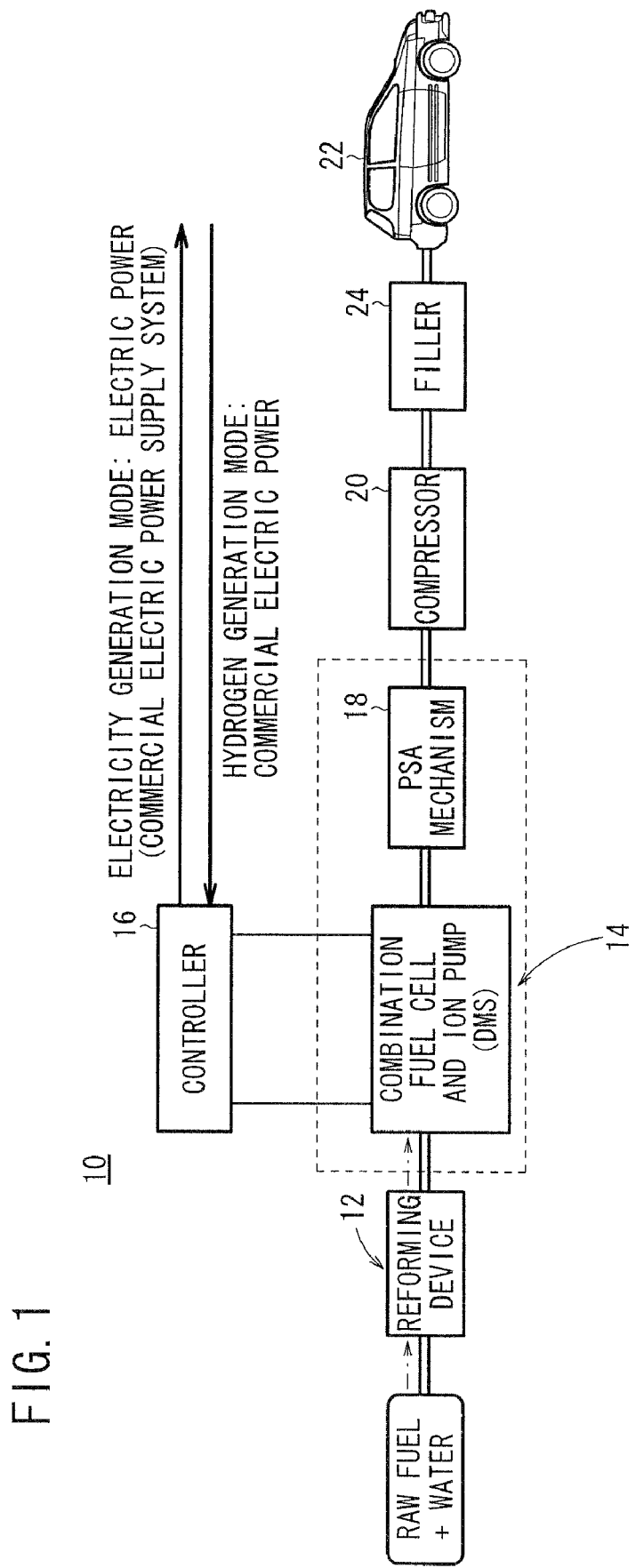
FIG. 1 is a block diagram showing an overall configuration of a hydrogen and power generation system according to a first embodiment of the present invention, to which a method of shutting down the hydrogen and power generation system according to the present invention may be applied.

FIG. 1 shows in block form a hydrogen and power generation system 10 according to a first embodiment of the present invention. The hydrogen and power generation system 10 can be used as a home energy station connected to a commercial power supply system, and can operate to supply electrical power in order to meet domestic electrical power needs, i.e., to follow load fluctuations in homes.

The hydrogen and power generation system 10 generally comprises a reforming device 12 for producing a reformed gas by reforming a mixture of a raw fuel, e.g., a city gas composed mainly of hydrocarbons and water vapor, a combination fuel cell and ion pump (DMS) 14 selectively operable an electricity generation mode and a hydrogen generation mode as described later, a controller 16 connected to the combination fuel cell and ion pump 14, for controlling the hydrogen and power generation system 10 in its entirety, a PSA (Pressure Swing Adsorption) mechanism 18 for dehumidifying and further refining a refined hydrogen gas supplied from the combination fuel cell and ion pump 14, a compressor 20 for compressing the refined hydrogen gas supplied from the PSA mechanism 18, and a filler 24 for filling a fuel cell vehicle 22 with hydrogen gas supplied as a fuel gas from the compressor 20.

The controller 16 has a function to apply electric charges to the combination fuel cell and ion pump 14 when the combination fuel cell and ion pump 14 operates in the electricity generation mode, and to apply potentials to the combination fuel cell and ion pump 14 when the combination fuel cell and ion pump 14 operates in the hydrogen generation mode.

Figure 2:
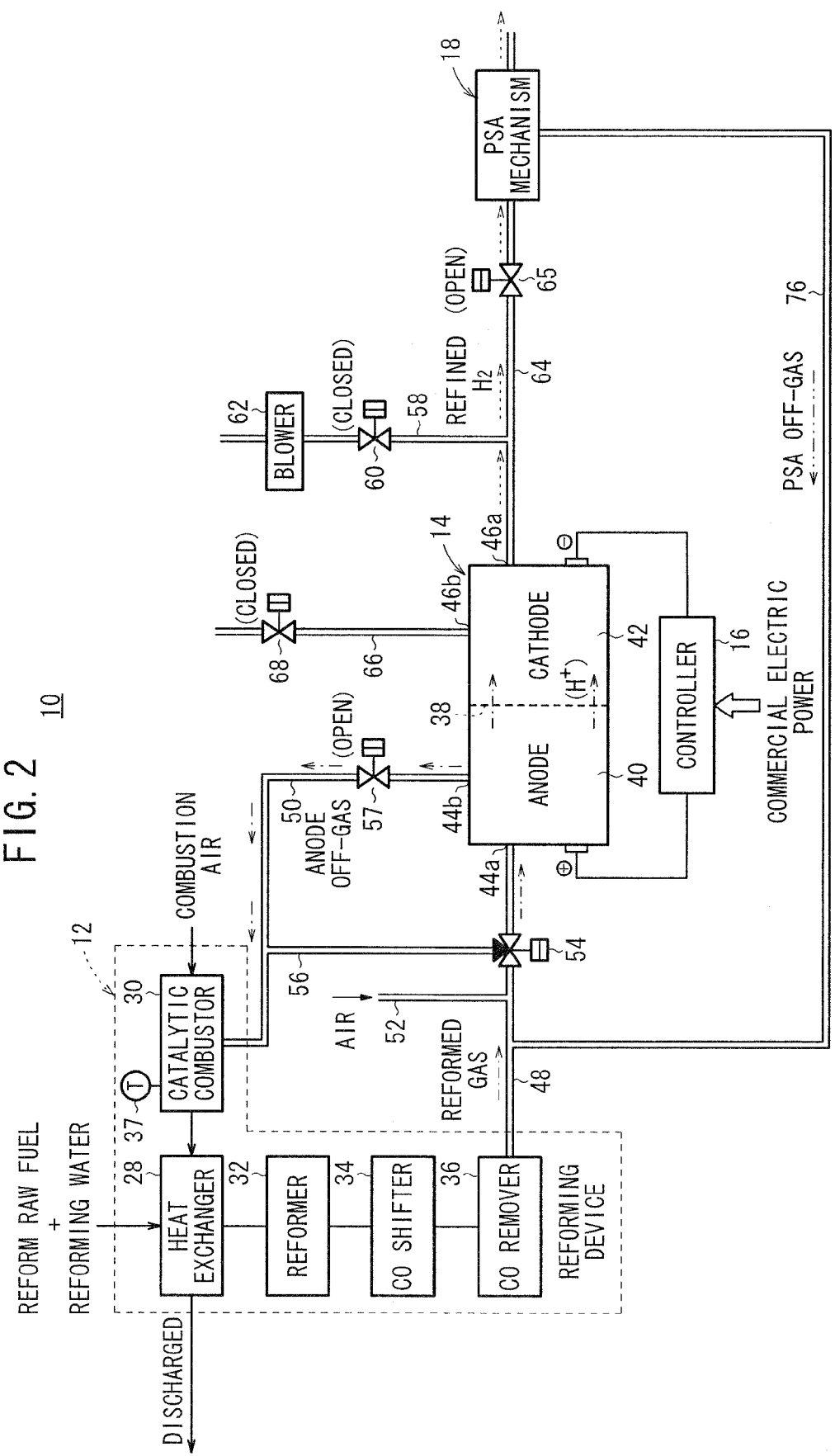
FIG. 2 is a detailed block diagram of the hydrogen and power generation system.

As shown in FIG. 2, the reforming device 12 comprises a heat exchanger 28 for producing a mixed fuel by mixing hydrocarbons such as methane ($CH_4$), ethane ($C_2H_6$), propane ($C_3H_8$), and butane ($C_4H_{10}$) contained in a city gas with water vapor, a catalytic combustor 30 for applying heat to the heat exchanger 28 in order to generate water vapor, a reformer 32 for producing a reformed gas by processing the mixed fuel according to a water vapor reforming process, a CO shifter (shift reactor) 34 for converting carbon monoxide and water vapor in the reformed gas into carbon dioxide and hydrogen according to a shift reaction, and a CO remover (selective oxidation reactor) 36 for adding a small amount of air to the reformed gas, and for reacting selectively absorbed carbon monoxide and oxygen in the air with each other in order to convert the selectively absorbed carbon monoxide into carbon dioxide. The catalytic combustor 30 is connected to a temperature sensor 37 that measures the temperature of the catalytic combustor 30.

The combination fuel cell and ion pump 14 comprises a membrane electrode assembly including a solid polymer electrolyte membrane 38 sandwiched between an anode 40 and a cathode 42. Although not shown, a plurality of membrane electrode assemblies and a plurality of separators are alternately stacked together into a fuel cell stack. The solid polymer electrolyte membrane 38 may comprise, for example, an electrolyte membrane of hydrocarbon, or an electrolyte membrane of fluorine such as perfluorocarbon or the like.

The combination fuel cell and ion pump 14 has an anode inlet 44a for supplying the reformed gas to the anode 40, an anode outlet 44b for discharging the consumed reformed gas (anode off-gas) from the anode 40, a cathode inlet 46a for supplying air as an oxygen-containing gas to the cathode 42 and for discharging a refined hydrogen gas produced from the reformed gas in the hydrogen generation mode, and a cathode outlet 46b for discharging the consumed air from the cathode 42.

The anode inlet 44a and the CO remover 36 of the reforming device 12 are connected to each other through a reformed gas passage 48. The anode outlet 44b and the catalytic combustor 30 of the reforming device 12 are connected to each other through an anode off-gas passage 50.

A PSA off-gas passage 76, an air (bleeding air) introduction port 52, and a three-way solenoid-operated valve (valve mechanism) 54 are connected to the reformed gas passage 48 successively downstream with respect to the direction in which the reformed gas flows through the reformed gas passage 48. The three-way solenoid-operated valve 54 is connected to one end of an anode bypass passage 56, the other end of which communicates with the anode off-gas passage 50. A solenoid-operated valve 57 is connected to the anode off-gas passage 50 upstream of the joint between the anode off-gas passage 50 and the anode bypass passage 56.

The cathode inlet 46a is connected to a cathode inlet passage 58. A solenoid-operated valve 60 is connected to the cathode inlet passage 58, and a blower (compressor) 62 also is connected to the cathode inlet passage 58 upstream of the solenoid-operated valve 60. A hydrogen gas passage 64 is connected to the cathode inlet passage 58. Another solenoid-operated valve 65 and the PSA mechanism 18 are connected to the hydrogen gas passage 64 successively downstream of the junction between the cathode inlet passage 58 and the hydrogen gas passage 64. The cathode outlet 46b is connected to a cathode off-gas passage 55. Another solenoid-operated valve 68, serving as a cut-off mechanism, is connected to the cathode off-gas passage 66.

Figure 3:
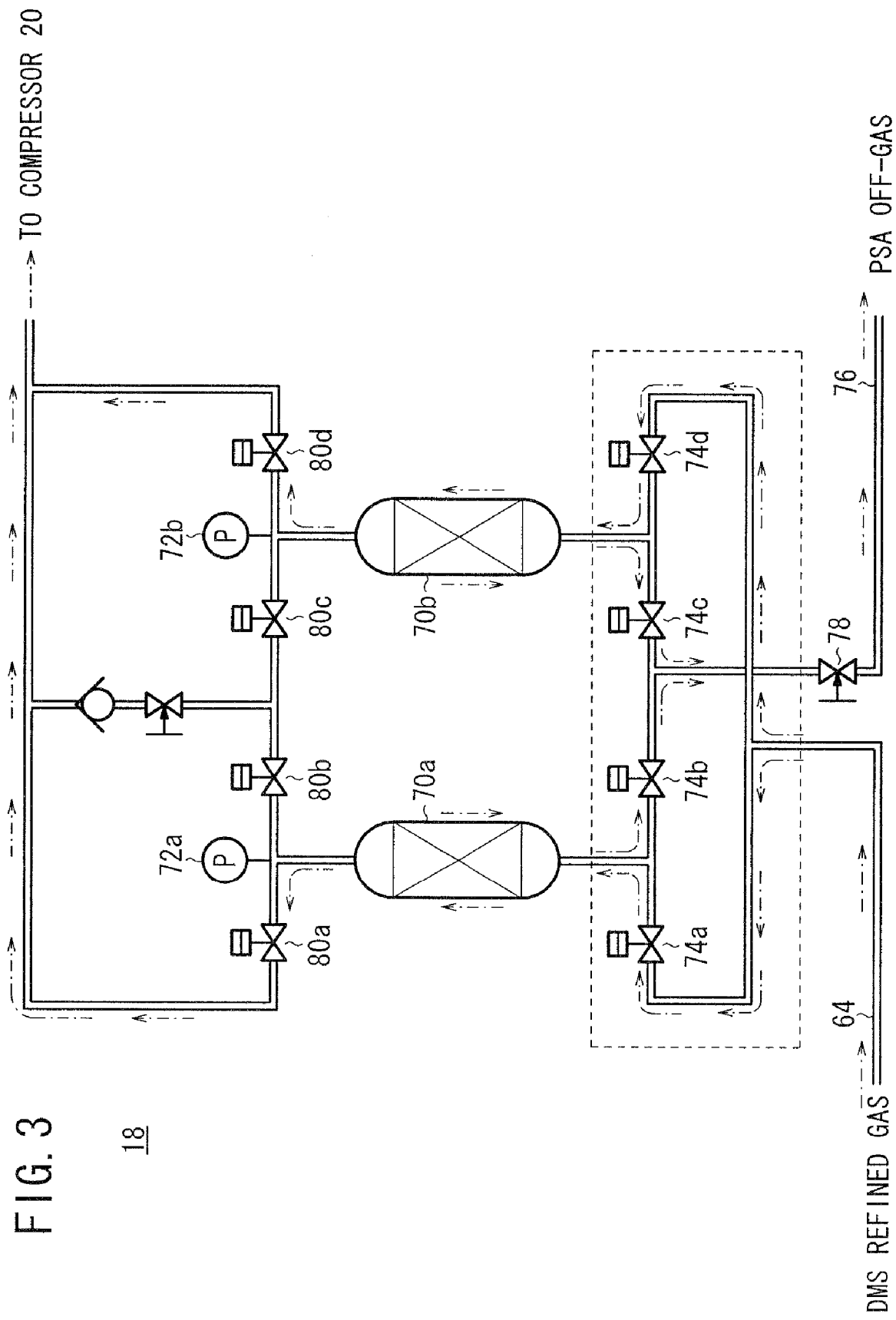
FIG. 3 is a diagram of a PSA mechanism of the hydrogen and power generation system.

As shown in FIG. 3, the PSA mechanism 18 comprises a dual-tower pressure swing adsorption device having two adsorption towers 70a and 70b. The adsorption towers 70a, 70b are connected to respective pressure sensors 72a, 72b for detecting respective pressures in the adsorption towers 70a, 70b. Off-gas valves 74a through 74d are disposed below inlet and outlet ports of the adsorption towers 70a, 70b, which are connected to a PSA off-gas passage 76 through the off-gas valves 74a through 74d. A flow control valve 78 is connected to the PSA off-gas passage 76.

Hydrogen gas discharge valves 80a through 80b are disposed above inlet and outlet ports of the adsorption towers 70a, 70b, which are capable of communicating with the compressor 20 through the hydrogen gas discharge valves 80a through 80b.

Normal operation of the hydrogen and power generation system 10 shall be described below.

When the hydrogen and power generation system 10 is activated, the heat exchanger 28 of the reforming device 12 is supplied with a raw fuel (reformable raw material) such as a city gas or the like together with reforming water. The heat exchanger 28 also is supplied with combustion heat from the catalytic combustor 30. Therefore, the reforming water supplied to the heat exchanger 28 is evaporated into water vapor, and a mixture of the raw fuel and the water vapor is supplied from the heat exchanger 28 to the reformer 32.

The reformer 32 processes the raw fuel with water vapor according to a water vapor reforming process in order to produce a reformed gas, which is supplied to the CO shifter 34 for carrying out a shift reaction. The reformed gas then is supplied from the CO shifter 34 to the CO remover 36 for promoting a selective oxidation reaction, from which the reformed gas is introduced into the reformed gas passage 48.

When the hydrogen and power generation system 10 is activated, the reformed gas passage 48 is held in fluid communication with the anode off-gas passage 50 through the three-way solenoid-operated valve 54 and the anode bypass passage 56. In addition, at this time, the solenoid-operated valves 57, 60, 65, 58 are closed. Therefore, the reformed gas produced by the reforming device 12 is supplied in its entirety directly to the catalytic combustor 30, in bypassing relation to the combination fuel cell and ion pump 14. In other words, the reforming device 12 operates stably with a minimum amount of heat in a full-volume circulation cycle, under a base load (see FIG. 5).

Then, the combination fuel cell and ion pump 14 starts operating in the hydrogen generation mode, for example. The reformed gas passage 48 is connected to the anode inlet 44a through the three-way solenoid-operated valve 54, while the solenoid-operated valves 57, 65 are opened (see FIG. 2). Therefore, the reforming device 12 supplies the reformed gas to the reformed gas passage 48, from which the reformed gas is supplied through the anode inlet 44a to the anode 40. Since the solenoid-operated valve 60 is closed, no air is supplied from the blower 62 to the cathode 42.

At this time, the controller 16 applies a positive potential to the anode 40 and a negative potential to the cathode 42. A reaction represented by $H_2 \rightarrow 2H^+ + 2e^-$ occurs at the anode 40, and hydrogen ions ($H^+$) move through the solid polymer electrolyte membrane 38 to the cathode 42. A reaction represented by $2H^+ + 2e^- \rightarrow H_2$ occurs at the cathode 42, while the hydrogen is under an increased pressure.

Therefore, protons (hydrogen ions) move from the anode 40 to the cathode 42, which produces highly pure hydrogen gas. The hydrogen gas is introduced from the cathode inlet passage 58 into the hydrogen gas passage 64, which supplies the hydrogen gas to the PSA mechanism 18.

Figure 5:
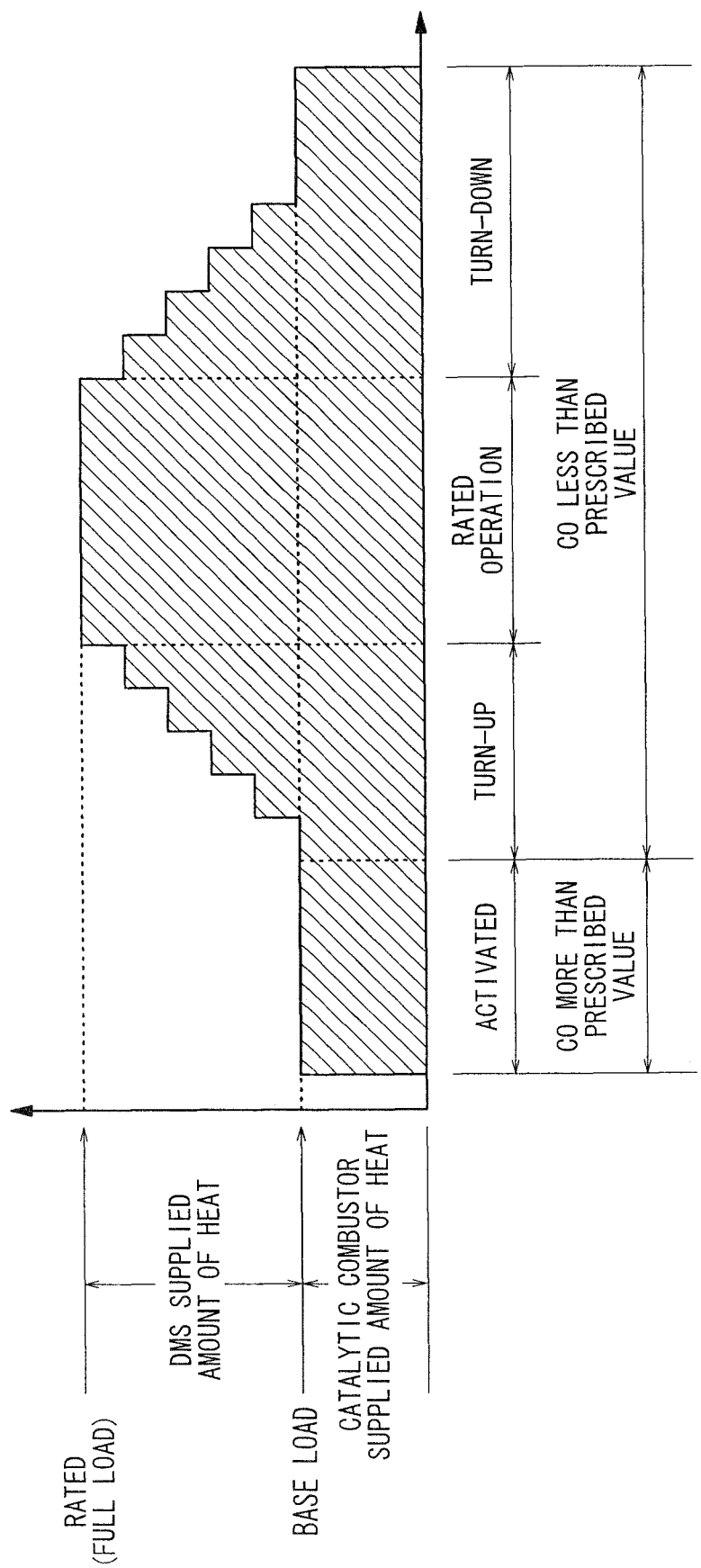
FIG. 5 is a timing chart of an operation control process for the hydrogen and power generation system.

When the combination fuel cell and ion pump 14 begins operating in the hydrogen generation mode, the load on the reforming device 12 increases stepwise or continuously (turn-up) as shown in FIG. 5. Specifically, the reformable raw fuel supplied to the reforming device 12 increases. At this time, the combination fuel cell and ion pump 14 increases the pressure of the refined hydrogen gas in the cathode 42.

As shown in FIG. 3, the off-gas valves 74a, 74d of the PSA mechanism 18 are opened in order to supply hydrogen gas to the adsorption towers 70a, 70b, which alternately adsorb and clean (depressurize) the hydrogen gas. Specifically, the adsorption towers 70a, 70b adsorb unwanted components (mainly water vapor and carbon dioxide) other than hydrogen, thus generating highly pure hydrogen gas, which is supplied to the compressor 20. The hydrogen gas is compressed by the compressor 20 and delivered to the filler 24, which fills the fuel cell vehicle 22 with hydrogen gas when necessary.

When the adsorption towers 70a, 70b clean the hydrogen gas, hydrogen gas containing water vapor therein exists in lower portions of the adsorption towers 70a, 70b. The hydrogen gas is discharged from the lower portions of the adsorption towers 70a, 70b, and then is discharged as a PSA off-gas into the PSA off-gas passage 76 when the off-gas valves 74b, 74c are opened.

As shown in FIG. 2, the PSA off-gas passage 76 is connected to the reformed gas passage 48. Therefore, the PSA off-gas is mixed with fresh reformed gas from the reforming device 12 and is supplied to the anode inlet 44a of the combination fuel cell and ion pump 14.

The reformed gas (containing unburned hydrogen gas) used by the anode 40 is delivered as an unburned gas from the anode outlet 44b, through the anode off-gas passage 50, and to the catalytic combustor 30. The unburned gas is burned in the catalytic combustor 30 as a result of combustion air that is supplied to the catalytic combustor 30, thus supplying heat to the heat exchanger 28.

Figure 6:
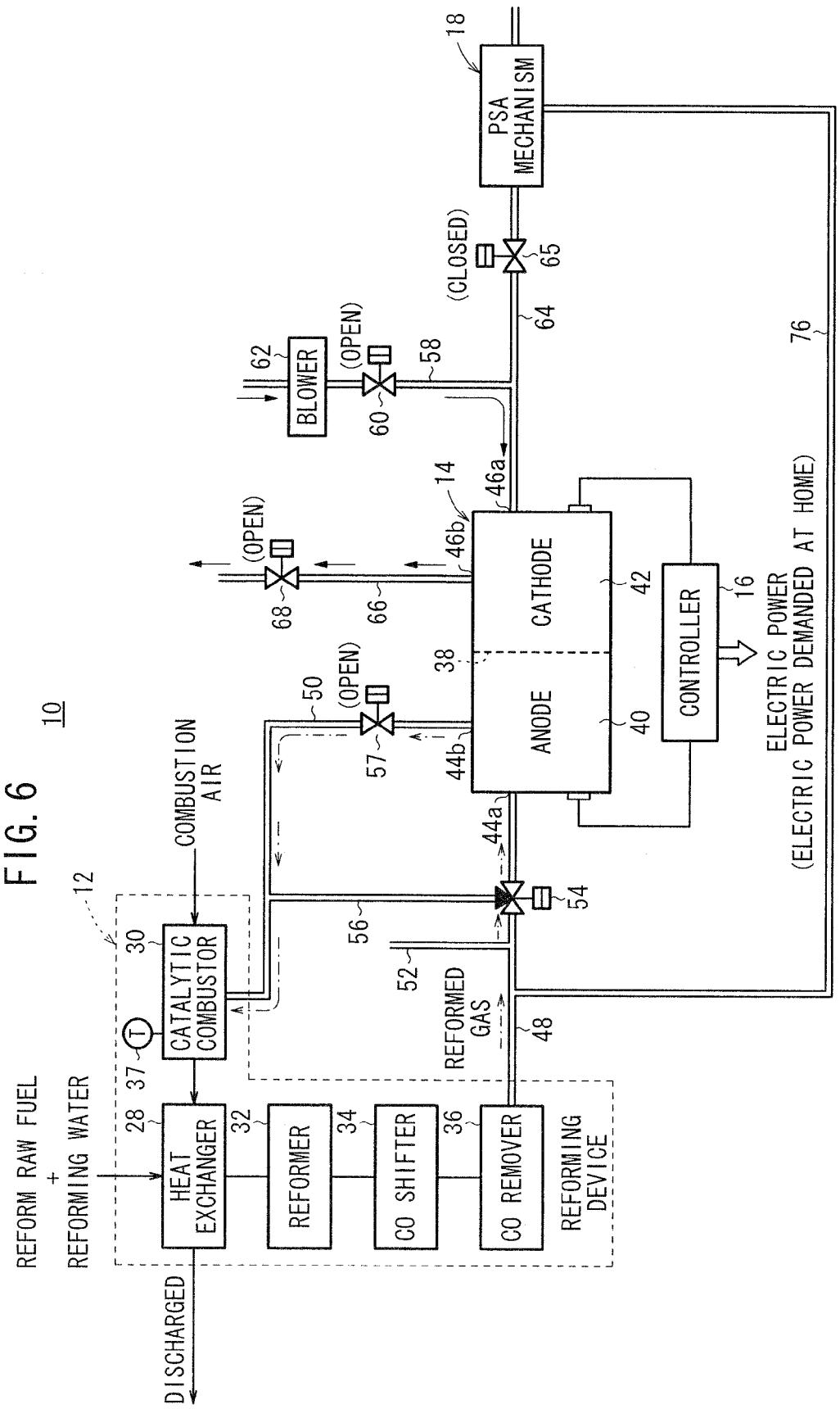
FIG. 6 is a block diagram of the hydrogen and power generation system operating in an electricity generation mode.

When the combination fuel cell and ion pump 14 operates in the electricity generation mode, as shown in FIG. 6, the solenoid-operated valves 57, 60, 68 are opened while the solenoid-operated valve 65 is closed. Thereafter, the controller 16 applies electric charges to the anode 40 and the cathode 42. The reformed gas is supplied to the anode 40 from the reforming device 12 through the reformed gas passage 48 and the anode inlet 44a. Since the solenoid-operated valve 60 is open, air (oxygen-containing gas) is supplied from the blower 62 through the cathode inlet passage 58 to the cathode 42.

The combination fuel cell and ion pump 14 generates electricity according to an electrochemical reaction between hydrogen contained in the reformed gas supplied to the anode 40 and oxygen contained in the air supplied to the cathode 42. The electrical energy generated by the combination fuel cell and ion pump 14 may be used as energy for domestic purposes, for example.

The air used by the cathode 42 is discharged out of the hydrogen and power generation system from the cathode outlet 46b and through the cathode off-gas passage 66. The reformed gas (containing unburned hydrogen gas) used by the anode 40 is delivered as an unburned gas from the anode outlet 44b, through the anode off-gas passage 50, and to the catalytic combustor 30.

Figure 7:
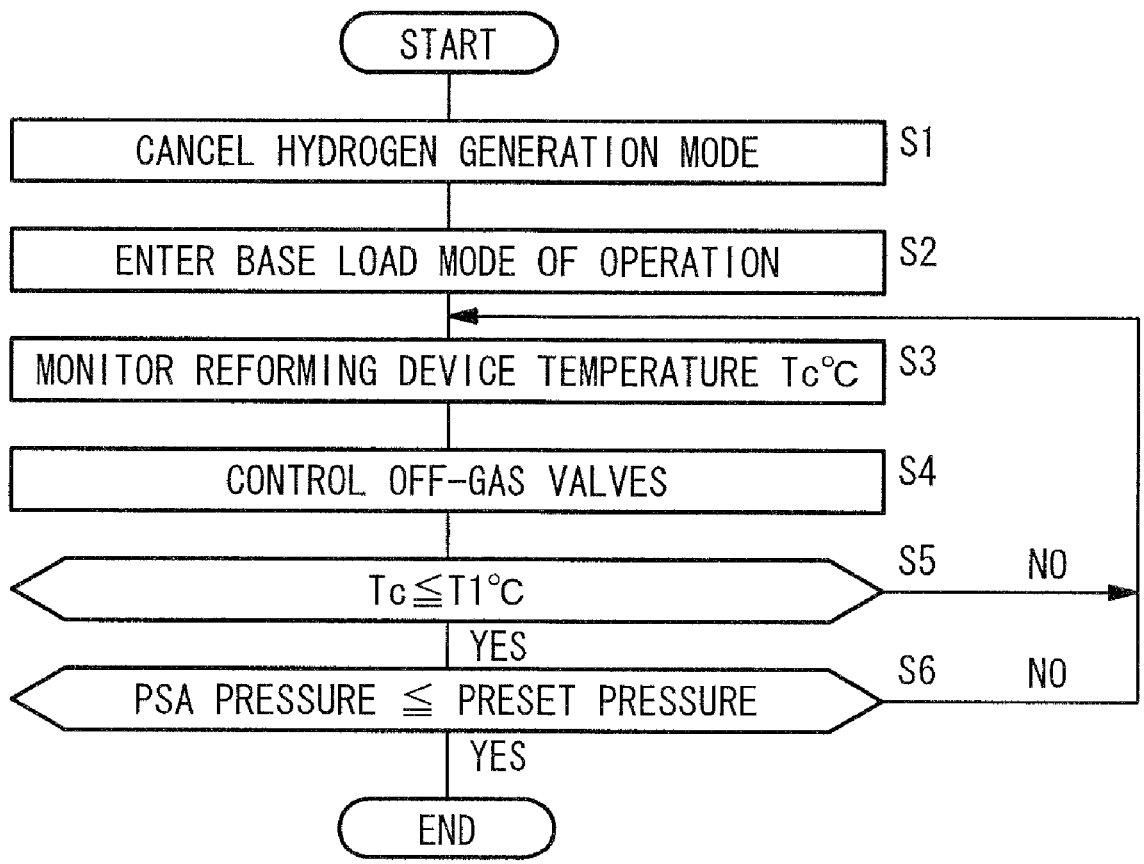
FIG. 7 is a flowchart of a method for shutting down a hydrogen generation mode of the hydrogen and power generation system.

A control process for shutting down the hydrogen generation mode of the hydrogen and power generation system 10 will be described below with reference to the flowchart shown in FIG. 7 and the timing chart shown in FIG. 5.

First, the hydrogen and power generation system 10 starts to cancel the hydrogen generation mode in step S1. When the hydrogen and power generation system 10 starts to cancel the hydrogen generation mode, the load on the reforming device 12 decreases stepwise or continuously (turn-down) as shown in FIG. 5. When the reforming device 12 enters a base load mode of operation in step S2, the reformed gas produced by the reforming device 12 is supplied in its entirety directly to the catalytic combustor 30, in bypassing relation to the combination fuel cell and ion pump 14 (full-volume circulation cycle).

In step S3, the controller 16 detects the temperature Tc° C. of the catalytic combustor 30 using the temperature sensor 37 in order to monitor the reforming device 12. Instead of or in addition to the temperature of the catalytic combustor 30, a period of time that has elapsed from the start of operation of the reforming device 12, or a pressure of the reformed gas produced by the reforming device 12, may also be used as a parameter for monitoring the reforming device 12.

In step S4, the off-gas valves 74a through 74d of the PSA mechanism 18 are controlled. Specifically, the off-gas valves 74a through 74d are selectively opened and closed as shown in FIG. 3, to simultaneously perform a depressurizing process by discharging hydrogen gas from the cathode 42 of the combination fuel cell and ion pump 14, together with a depressurizing process (cleaning process) by discharging hydrogen gas (and water vapor, etc.) from the adsorption towers 70a, 70b of the PSA mechanism 18.

The PSA off-gas (containing hydrogen gas) discharged from the cathode 42 of the combination fuel cell and ion pump 14 and the adsorption towers 70a, 70b of the PSA mechanism 18 is supplied to the reformed gas passage 48 through the PSA off-gas passage 76. Therefore, the PSA off-gas is mixed with the reformed gas produced by the reforming device 12, and then is supplied as an unburned gas from the anode bypass passage 56 to the catalytic combustor 30 through the anode off-gas passage 50.

If the controller 16 judges that the temperature Tc° C. of the catalytic combustor 30 detected by the temperature sensor 37 is equal to or lower than a preset temperature Tl° C. in step S5 (YES), then the controller 16 determines whether the pressure in the adsorption towers 70a, 70b of the PSA mechanism 18 has been lowered to a preset pressure or not. The preset pressure is set essentially as a pressure that is close to atmospheric pressure.

If the controller 16 judges that the pressure in the adsorption towers 70a, 70b of the PSA mechanism 18 has been lowered to the preset pressure in step S6 (YES), then the hydrogen and power generation system 10 finishes the control process of shutting down the hydrogen generation mode.

According to the present embodiment, when the hydrogen generation mode is shut down, the cathode 42 of the combination fuel cell and ion pump 14 and the adsorption towers 70a, 70b of the PSA mechanism 18 have been depressurized. Consequently, while the hydrogen and power generation system 10 is at rest, hydrogen gas left under a relatively high pressure in the cathode 42 of the combination fuel cell and ion pump 14 and the adsorption towers 70a, 70b of the PSA mechanism 18 is not diffused into the anode 40 of the combination fuel cell and ion pump 14. Therefore, the hydrogen gas is prevented from flowing back into the reforming device 12, and an excessive unburned gas is prevented from being supplied to the catalytic combustor 30, which thus is prevented from becoming unduly heated.

As described above, the PSA off-gas (containing hydrogen gas), which is discharged from the cathode 42 of the combination fuel cell and ion pump 14 and from the adsorption towers 70a, 70b of the PSA mechanism 18, is supplied through the PSA off-gas passage 76 to the reformed gas passage 48. Therefore, since the PSA off-gas is recycled, no dedicated facility for processing the PSA off-gas is required, thereby enabling the hydrogen and power generation system 10 to be made economical and smaller in size as a whole.

Figure 8:
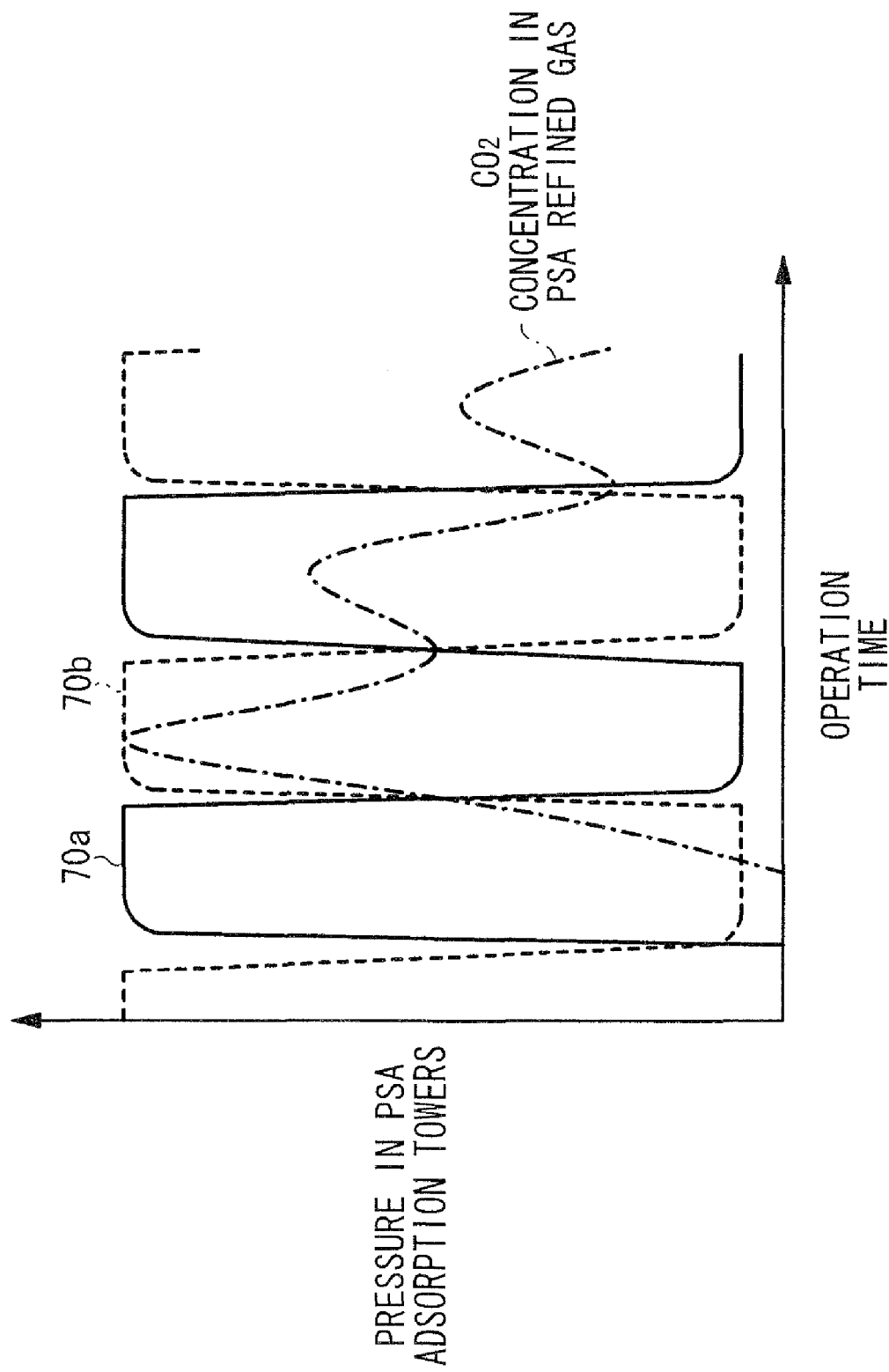
FIG. 8 is a diagram showing an in-tower pressure and a carbon dioxide concentration of a conventional PSA mechanism.

If the adsorption tower 70b is stopped in an adsorbing position (high-pressure state) while the hydrogen and power generation system 10 is at rest, then since normal gas flow is stopped in the adsorption tower 70b, the gas composition in the adsorption tower 70b becomes uniform vertically therein, as time elapses from the stoppage of the adsorption tower 70b. When the hydrogen and power generation system 10 is activated at a subsequent time, the $CO_2$ (carbon dioxide) concentration within the hydrogen gas refined by the PSA mechanism 18 increases, as shown in FIG. 8, which illustrates a conventional PSA mechanism, and the PSA mechanism 18 fails to produce highly pure hydrogen gas.

Figure 9:
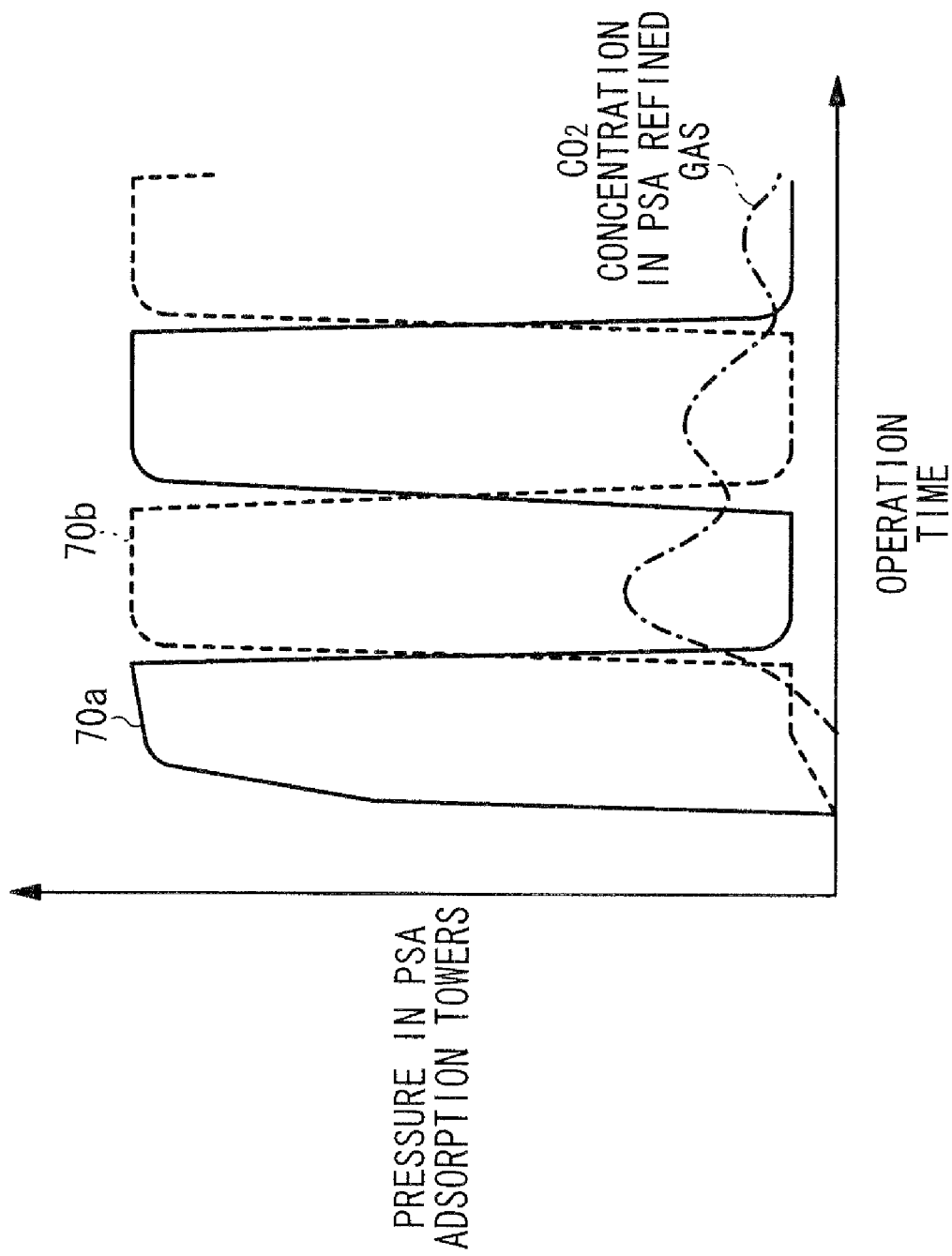
FIG. 9 is a diagram showing an in-tower pressure and a carbon dioxide concentration of the PSA mechanism according to the present embodiment.

In contrast, according to the present embodiment, when the hydrogen generation mode is shut down, the adsorption towers 70a, 70b of the PSA mechanism 18 have already been depressurized. Therefore, as shown in FIG. 9, the PSA mechanism 18 is capable of producing highly pure hydrogen gas immediately after it is activated. The PSA mechanism 18 maintains a high refining capability for efficiently refining hydrogen gas.

Figure 4:
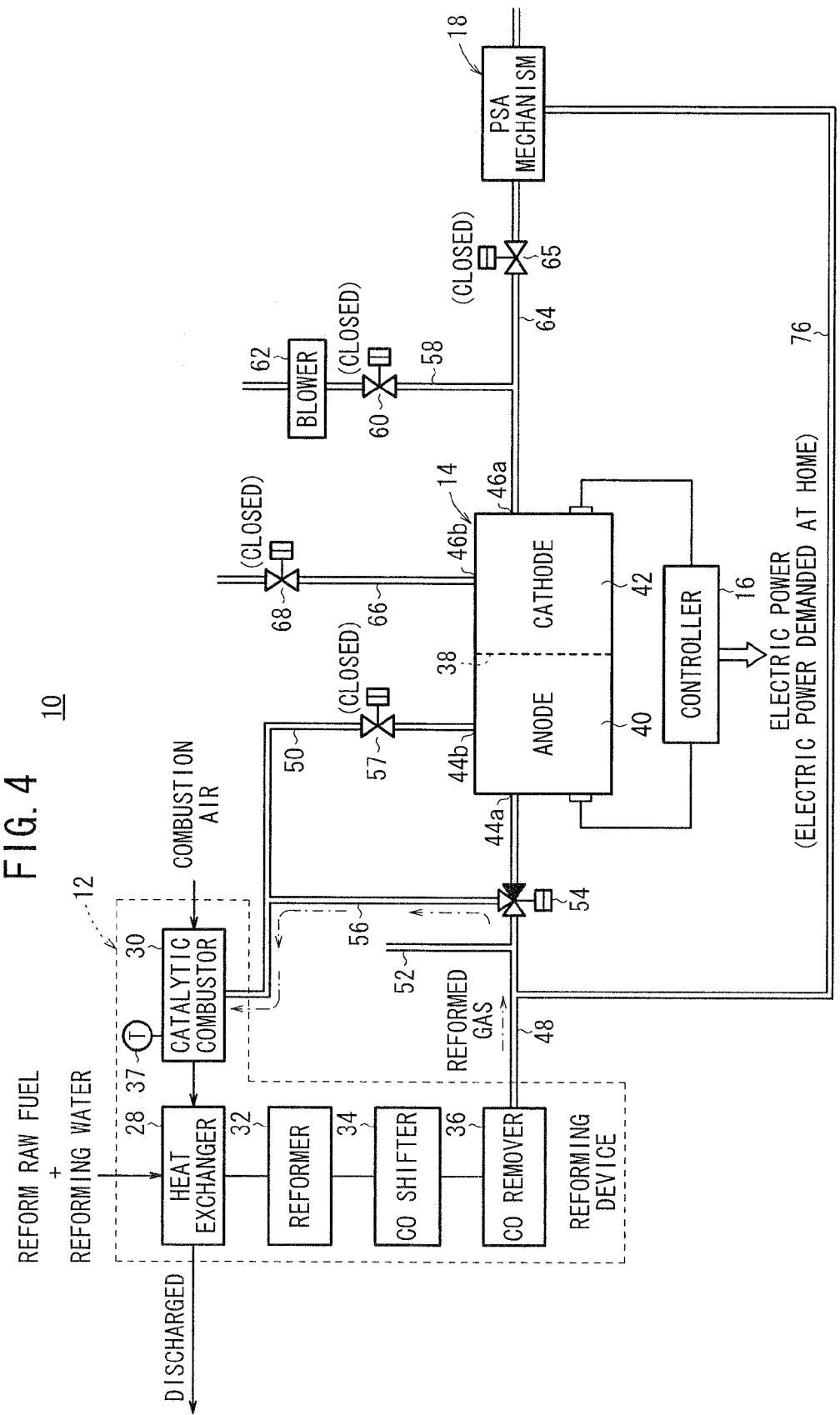
FIG. 4 is a block diagram illustrating a full-volume circulation cycle, which operates under a base load imposed on the hydrogen and power generation system.

When the cathode 42 of the combination fuel cell and ion pump 14 and the adsorption towers 70a, 70b of the PSA mechanism 18 are depressurized, the hydrogen and power generation system 10 operates under a base load in the full-volume circulation cycle (see FIG. 4). The opening of the off-gas valves 74a through 74d is controlled in order to control the depressurizing rate, for thereby preventing the catalytic combustor 30 from being excessively heated, and thus allowing the catalytic combustor 30 to generate heat stably.

According to the present embodiment, furthermore, the PSA off-gas passage 76, the air introduction port 52, and the three-way solenoid-operated valve 54 are connected to the reformed gas passage 48 successively downstream with respect to the direction in which the reformed gas flows through the reformed gas passage 48, as described above. As a result, since the PSA off-gas passage 76 is not connected to the reformed gas passage 48 downstream of the air introduction port 52, the PSA off-gas is not introduced into the air that is supplied from the air introduction port 52 to the reformed gas passage 48.

Figure 10:
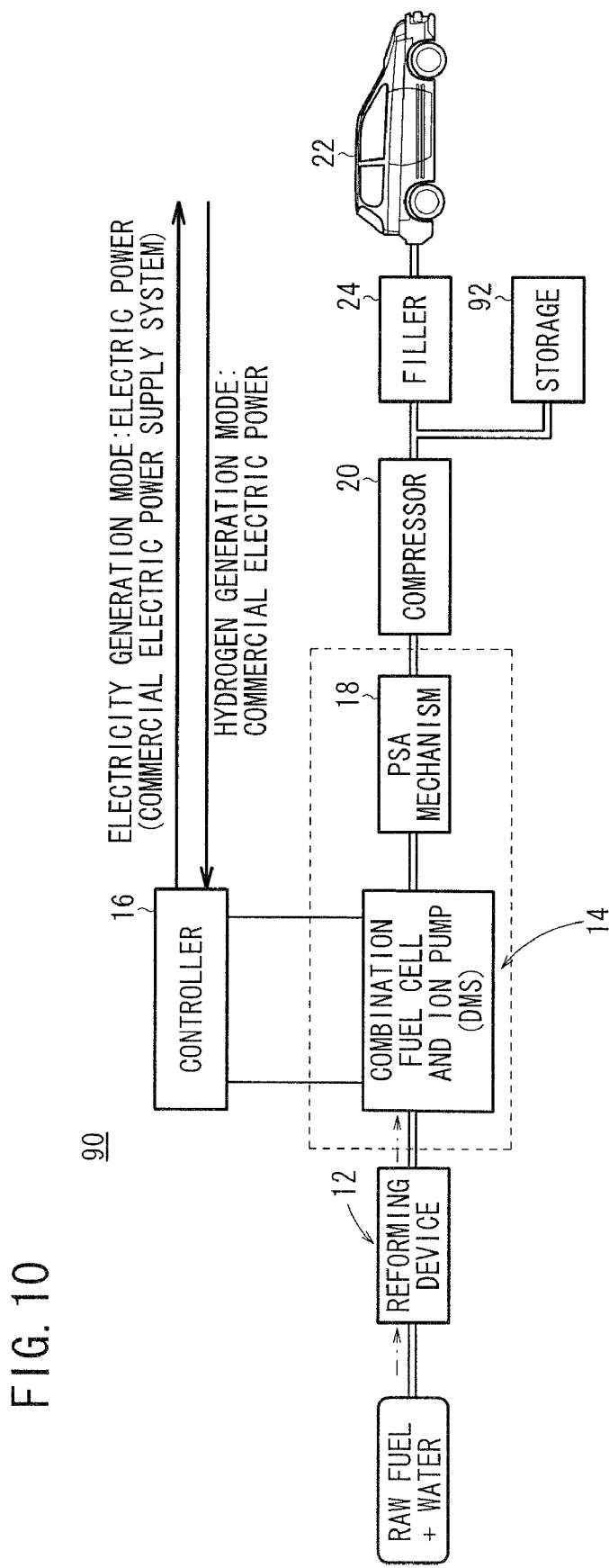
FIG. 10 is a block diagram showing an overall configuration of a hydrogen and power generation system according to a second embodiment of the present invention.

FIG. 10 shows in block form an overall configuration of a hydrogen and power generation system 90 according to a second embodiment of the present invention.

As shown in FIG. 10, the hydrogen and power generation system 90 comprises a reforming device 12, a combination fuel cell and ion pump 14, a controller 16, a PSA mechanism 18, a compressor 20, a filler 24, and a storage 92, which branches off from the compressor 20. The storage 92 comprises a tank for temporarily storing the refined hydrogen gas and for supplying the stored hydrogen gas to the filler 24, when necessary.

Although certain preferred embodiments of the present invention have been shown and described in detail, it should be understood that various changes and modifications may be made to the embodiments without departing from the scope of the invention as set forth in the appended claims.

What is claimed is:

1. A hydrogen and power generation system comprising:
   a reforming device for producing a reformed gas by reforming a raw fuel mainly composed of hydrocarbons, the reforming device having a combustor as a heat source;
   a combination fuel cell and ion pump comprising a membrane electrode assembly having an electrolyte and a pair of anode and cathode disposed on respective opposite sides of the electrolyte, the combination fuel cell and ion pump being operable selectively in a hydrogen generation mode for delivering hydrogen in the reformed gas through the electrolyte to the cathode by supplying the reformed gas to the anode while applying a potential between the anode and the cathode, and an electricity generation mode for generating electricity by supplying the reformed gas to the anode and supplying an oxygen-containing gas to the cathode while applying a potential between the anode and the cathode;
   a reformed gas passage providing fluid communication between a reformed gas outlet of the reforming device and an anode inlet of the combination fuel cell and ion pump;
   a PSA mechanism for removing an unwanted component from the hydrogen produced by the combination fuel cell and ion pump, the PSA mechanism having an adsorption tower held in fluid communication with the cathode, for receiving the hydrogen from the combination fuel cell and ion pump; and
   a PSA off-gas passage having one end connected to an off-gas outlet of the PSA mechanism and another end connected to the reformed gas passage.

2. A hydrogen and power generation system according to claim 1, further comprising:
   an anode off-gas passage for supplying an anode off-gas discharged from the anode to the combustor;
   a valve mechanism connected to the reformed gas passage downstream of a junction between the reformed gas passage and the PSA off-gas passage; and
   an anode bypass passage controllable by the valve mechanism for providing fluid communication between the reformed gas passage and the anode off-gas passage.

3. A hydrogen and power generation system according to claim 1, further comprising:
   an air introduction port connected to the reformed gas passage at a position between the reformed gas outlet of the reforming device and the anode inlet.

4. A hydrogen and power generation system according to claim 3, wherein the PSA off-gas passage is connected to the reformed gas passage at a position between the reformed gas outlet of the reforming device and the air introduction port.

5. A method of shutting down a hydrogen and power generation system including a reforming device for producing a reformed gas by reforming a raw fuel mainly composed of hydrocarbons, the reforming device having a combustor as a heat source, a combination fuel cell and ion pump comprising a membrane electrode assembly having an electrolyte and a pair of anode and cathode disposed on respective opposite sides of the electrolyte, the combination fuel cell and ion pump being operable selectively in a hydrogen generation mode for delivering hydrogen in the reformed gas through the electrolyte to the cathode by supplying the reformed gas to the anode while applying a potential between the anode and the cathode, and an electricity generation mode for generating electricity by supplying the reformed gas to the anode and supplying an oxygen-containing gas to the cathode while applying a potential between the anode and the cathode, a reformed gas passage providing fluid communication between a reformed gas outlet of the reforming device and an anode inlet of the combination fuel cell and ion pump, a PSA mechanism for removing an unwanted component from the hydrogen produced by the combination fuel cell and ion pump, the PSA mechanism having an adsorption tower held in fluid communication with the cathode, for receiving the hydrogen from the combination fuel cell and ion pump, and a PSA off-gas passage having one end connected to an off-gas outlet of the PSA mechanism and another end connected to the reformed gas passage, the method comprising the step of:
   controlling valves of the PSA mechanism so as to reduce the pressure in the cathode of the combination fuel cell and ion pump and the pressure in the adsorption tower of the PSA mechanism through the PSA off-gas passage when the hydrogen generation mode has finished.

6. A method according to claim 5, further comprising the step of:
   supplying the reformed gas generated by the reforming device in its entirety to the combustor when the hydrogen generation mode has finished.

7. A method according to claim 5, further comprising the steps of:
   detecting the temperature of the combustor; and
   controlling the valves of the PSA mechanism based on the detected temperature.

* * * * *